(12) United States Patent
Constant et al.

(10) Patent No.: US 6,221,925 B1
(45) Date of Patent: *Apr. 24, 2001

(54) FOAMABLE HIGH DENSITY POLYETHYLENE

(75) Inventors: David R. Constant, Clinton, NJ (US); Anthony Poloso, Yardley, PA (US)

(73) Assignee: Mobil Oil Corporation, Fairfax, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/300,065

(22) Filed: Apr. 27, 1999

Related U.S. Application Data

(60) Continuation-in-part of application No. 09/086,652, filed on May 29, 1998, now Pat. No. 5,916,926, which is a division of application No. 08/761,767, filed on Dec. 5, 1996, now abandoned.

(51) Int. Cl.$^7$ ........................................................ C08J 9/36
(52) U.S. Cl. .................................. 521/53; 521/96; 521/99; 521/149
(58) Field of Search .................................. 521/53, 96, 99, 521/149

(56) References Cited

U.S. PATENT DOCUMENTS

| | | | | |
|---|---|---|---|---|
| 3,939,565 | * | 2/1976 | Good ..................................... | 428/315 |
| 4,206,166 | * | 6/1980 | Hayashi et al. ....................... | 264/126 |
| 4,510,031 | * | 4/1985 | Matsummura et al. ........... | 204/159.2 |
| 5,574,074 | * | 11/1996 | Zushi et al. ........................... | 521/143 |
| 5,736,618 | | 4/1998 | Poloso ................................... | 525/387 |
| 5,916,926 | * | 6/1999 | Cooper ert al. ........................ | 521/53 |

* cited by examiner

Primary Examiner—Blaine Copenheaver
(74) Attorney, Agent, or Firm—Lori F. Cuomo

(57) ABSTRACT

Control of high density polyethylene resin melt strength and melt viscosity is useful for producing foamed articles. The foamed articles are produced by compounding high density polyethylene with a peroxide and/or electron beam exposure.

6 Claims, No Drawings

FOAMABLE HIGH DENSITY POLYETHYLENE

RELATED APPLICATIONS

This is a continuation in part of U.S. patent application Ser. No. 09/086,652, filed May 29, 1998, now U.S. Pat. No. 5,916,926 which is a divisional of U.S. patent application Ser. No. 08/761,767, filed Dec. 5, 1996, now abandoned.

FIELD OF THE INVENTION

The invention relates to foaming of high density polyethylene (HDPE) to form articles having a low final density and a fine closed cell structure. The HDPE resin is altered with respect to low shear viscosity and elasticity to improve melt strength and thereby foamability.

BACKGROUND OF THE INVENTION

Poor melt strength of high density polyethylene is a major factor which makes it difficult to produce foamed articles therefrom. In the past, polyethylene foams have been routinely made from high pressure-low density polyethylene (LDPE) which exhibits superior melt strength compared to that of the HDPE, at the same viscosities. The melt strength of HDPE can be increased simply by increasing the HDPE molecular weight. However, the increase in molecular weight is accompanied by an increase in melt viscosity, which interferes with processability and contributes to cell collapse in the foaming process. The highly branched nature and low viscosity at high shear of the LDPE provides for a desirable environment for foaming, as compared to the normally linear HDPE molecule.

Therefore, it is an object of the present invention to provide an HDPE suitable for foaming.

SUMMARY OF THE INVENTION

The invention provides an HDPE resin with high melt strength relative to its melt viscosity and is thus similar to high pressure low density polyethylene. The invention also provides foams of the HDPE and articles of manufacture produced therefrom. The process of the present invention comprises treating the HDPE with low levels of high temperature peroxide and/or electron beam radiation to induce long chain branching of the previously linear HDPE molecules. Melt strength and elasticity are improved dramatically without a large increase in viscosity, thereby improving the foaming characteristics of the HDPE resin.

The invention therefore includes a process for forming articles consisting essentially of foamed high density polyethylene having an original density, prior to foaming, of at least 0.94 g/cc, comprising treating said high density polyethylene, prior to foaming, with a peroxide to provide a peroxide treated high density polyethylene having a low shear viscosity which is at least about 1.25 times the viscosity of the untreated high density polyethylene measured at 0.1 rad./sec. and a high shear viscosity which is less than about 3.0 times the viscosity of the untreated high density polyethylene measured at 100 rad./sec.;

admixing the peroxide treated high density polyethylene with a blowing agent; and foaming the peroxide treated high density polyethylene to form a closed cell foam product which exhibits a density reduction, as a result of foaming, of over 20%.

DETAILED DESCRIPTION OF THE INVENTION

The foamed products of the present invention are produced from an HDPE resin which is generally, at least 95% HDPE. The process of the present invention comprises compounding, or admixing, the HDPE with a peroxide and/or exposing to electron beam radiation.

The starting HDPE material has a density of at least 0.94 g/cc as measured by ASTM D-792. The HDPE may be the product of gas phase, slurry or solution polymerization. Polymerization can be conducted in the presence of metallocene, or metallocene based catalysts, as well as with chromium or Ziegler catalysts. The HDPE can be a homopolymer of ethylene or modified to contain small amounts of comonomer selected from an alpha olefin containing 3 to 10 carbon atoms, preferably 4 to 10 carbon atoms; in these instances the polymer resin will contain greater than 95% of its weight as ethylene units.

In accordance with the invention, it has been discovered that the control of melt strength and melt viscosity may be achieved in a single operation. In accordance with the invention, the untreated or unmodified HDPE may be subjected to peroxide modification at elevated temperatures, which are above ambient. The level of peroxide added to the HDPE is generally in the range of from about 50 to about 5000 ppm. The temperature of the peroxide treatment is generally in the range of from about 150° to about 260° C.

The peroxides used in the present invention are high temperature peroxides that may undergo almost complete decomposition at normal compounding temperatures (200° to 260° C.). The half life temperature of the peroxides used in the present invention at 0.1 hours is greater than 130° C. Half life temperature at a given time is the temperature at which one half of the peroxide has decomposed. Suitable peroxides include but are not limited to dicumyl peroxide, 2,5-dimethyl-2,5-di-(tert butyl peroxy), hexane, tert-butyl cumyl peroxide, di-(2-tert-butylperoxyisopropyl) benzene, di-tert-butyl peroxide, 2,5-dimethyl-2,5-di-(tert-butylperoxy)hexyne-3, cumene hydroperoxide these contain 2 to 20 carbon atoms. The peroxide may be preblended with the HDPE or introduced separately as a liquid feed, such as in a mineral oil carrier and compounded using conventional compounding methods.

Treatment of the HDPE is preferably in a nitrogen atmosphere. Nitrogen is introduced to the zone of HDPE treatment in accordance with the invention at the feed throat of the compounding extruder so as to minimize exposure to oxygen. Compounding under this condition significantly enhances the crosslinking efficiency of the peroxide. The resultant peroxide treated HDPE retains its thermoplastic properties. This property is valuable for recycling.

The HDPE may also be compounded or admixed with at least one, preferably two, antioxidants. The role of antioxidant stabilizers in HDPE is to protect the polymer from oxidative degradation after compounding or admixing and thus preserve its strength properties. The mechanism for degradation of HDPE via oxidation is an autocatalyzed, free radical chain process. During this process, hydroperoxides are formed which decompose into radicals and accelerate the degradation. Antioxidants prevent this degradation by (1) scavenging radicals to interrupt the oxidative chain reaction resulting from hydroperoxide decomposition and (2) consuming hydroperoxides.

The antioxidants contain one or more reactive hydrogen atoms which tie up free radicals, particularly peroxy radicals, forming a polymeric hydroperoxide group and relatively stable antioxidant species. The mixture of the primary antioxidant and/or secondary antioxidant in the HDPE is in the range of from about 300 to about 3000 ppm based on the desired level of oxidative stability desired in the final foamed product. The phenolic antioxidants are the largest selling antioxidant used in plastics today; they include simple phenols, bisphenols, thiobisphenols and polyphenols. Primary antioxidants include hindered phenols such as Ciba Geigy's Irganox 1076, 1010 and Ethyl 330.

Secondary antioxidants include phosphorus-based antioxidants, generally phosphites. The phosphite acts by converting hydroperoxides to non-chain propagating alcohols, while the phosphite itself is oxidized to phosphates. These secondary antioxidants are used when processing stability is of concern. Trisnonylphenyl phosphite is one of the most widely used phosphites. Other suitable secondary antioxidants are GE's Weston TNPP, Ciba Geigy's Ultranox 626 and Irgafos 168. An exhaustive list of primary and secondary antioxidants can be founds in the reference [*Chemical Additives for the Plastics Industry*, Radian Corporation, Noyes Data Corporation, N.J., 1987].

The resultant HDPE can be characterized by its large increase in low shear viscosity (measured at 0.1 rad/sec) and small increase in high shear viscosity (measured at 100 rad/sec). The resultant HDPE also exhibits a significant increase in elasticity for a given melt index. Increasing elasticity indicates increased melt strength. Elasticity is defined as the ratio of G' to G", the elastic modulus to the storage modulus. The ratio of viscosity of peroxide treated HDPE to untreated HDPE ranges from 1.25 to 40 at low shear, preferably 1.8 to 30, and from 1.0 to 3.0 at high shear, preferably 1.0 to 2.2.

The peroxide treated HDPE of the present invention is characterized by viscosity and elasticity as shown below:

|  | General Range | Preferred Range | Most Preferred Range |
|---|---|---|---|
| Melt Index, dg/min* (MI) | 0.05–200 | 0.1–50 | 0.1–20 |
| Low Shear Viscosity @ 0.1 rad/sec frequency, kPa-s** | 1–80 | 1.5–70 | 1.8–65 |
| Elasticity*** | .05–2.0 | .07–1.8 | .1–1.5 |

*Melt Index (MI) is measured as $I_2$, ASTM 1238 [condition E at 190° C.]
**190° C. test temperature. The SI unit is Pascal-second, abbreviated Pa-s. In the current context, viscosity is in units of 1000 Pa-s, or k Pa-s.
***Elasticity is the ratio of G'/G" at 0.1 rad/sec, where G' is the elastic modulus and G" is the storage modulus, and is a good indication of the relative melt strength of similar MI resins.

Viscosity at low shear rates is measured as dynamic viscosity at 190° C. using dynamic melt rheometers as outlined in ASTM D 4440–84. The test subjects the melt to oscillatory shearing over a range of frequency, and the complex viscosity at a low frequency of 0.1 rad/sec is used in this study. The sample is in the form of a disc, premolded using a temperature not exceeding 180° C. The test geometry consists of parallel plates, 25 mm in diameter. Strain magnitude used is preferably at 10% and should not exceed 50%. A nitrogen atmosphere is maintained during the test. Note that the complex viscosity thus measured is equivalent to steady shear viscosity (as measured in ASTM-D3835-90, for example), when compared at equal values of frequency and shear rate. See, for example, the textbook "Dynamics of Polymeric Liquids", by R. B. Bird, R. C. Armstrong and O. Hassager, (Wiley 1977) page 195."

Foaming can be undertaken in conventional extrusion and/or molding equipment. The treated HDPE is admixed with a conventional chemical or physical blowing agent at temperatures ranging from 150° to 250° C. to produce a foam comprising closed cells. Commercially available chemical blowing agents include Safoam FPE-50, Clariant CF 20 E. Physical blowing agents include isobutane. With isobutane the density reduction, as a result of foaming, is over 60%. Either open or closed cell foams are contemplated; where the choice and amount of blowing agent determines that cell structure. Other suitable chemical and/or physical blowing agents include carbon dioxide, pentane, hexane, heptane, benzene, toluene, methyl chloride, trichloroethylene, dichloroethane, trichlorofluoromethane, dichlorodifluoromethane, trifluorochloromethane, 1,2,2-trichlorotrifluoroethane, and 1,2-dichlorotetrafluoroethane. The amount of blowing agent is in the range of from about 0 to about 5 moles/kg. The percent reduction in density relates to lightness in weight and is desirable for controlling material weight and costs.

Generally, in accordance with the invention, the density reduction as a result of foaming is over 20%, preferably over 40% and most preferably over 60%. The foams produced by the process of the present invention are predominantly closed cell structures, i.e. at least 80% closed cells.

The foamed HDPE products are characterized by flexural strength and characterized by flexural modulus. These characteristics vary with degree of density reduction (higher and lower) due to foaming. The higher stiffness of the higher density HDPE foams of the present invention over LDPE foams may be an advantage for certain applications, such as rigid packaging, recreational equipment, tubing and structural foam. These higher density foamed products exhibit densities in the range of from about 0.55 to about 0.8 g/cc, preferably less than 0.8 g/cc. The lower density HDPE foams may be used in electrical insulation, buoyancy aids, packaging, insulation, cushioning applications, toys, household articles and the like. Densities of these foams are in the range of from 0.016 to 0.064 g/cc, preferably less than 0.064 g/cc.

The higher density HDPE foam products may be in sheet form using conventional extrusion technology (0.125–1.00 in. thick) or in complex molded part form of the same cross-sectional thickness, produced using injection molding.

The lower density HDPE foam products may be in sheet form (0.010–0.250 in. thick) produced using an annular die, horizontally mounted to the extruder, slitting the foamed tube over a cooling mandrel to make flat sheet. The lower density products may also be in plank from (0.2516–4.0 in. thick) produced using a horizontal flat die.

The following examples are illustrative of the present invention:

EXAMPLE 1

A conventional 14 MI HDPE resin is treated with peroxide to yield a peroxide treated 7 MI HDPE resin with improved foaming and processing characteristics. The conventional 14 MI HDPE resin is treated with 275 ppm of 2,5-dimethyl-2,5-di (tert-butylperoxy) hexane peroxide at 200° C. in a twin screw extruder The peroxide is Triganox 101 E-10, manufactured by Akzo Inc. The resulting resin is tested for Theological properties and compared to a conventional 7 MI HDPE resin used commercially for structural foam injection molding.

| Properties | Conventional 14 MI HDPE | Peroxide Treated 7 MI HDPE | Conventional 7 MI HDPE |
|---|---|---|---|
| Melt Index, dg/min | 14.0 | 7.0 | 7.0 |
| Viscosity @ .1 rad/sec., k Pa-s | 0.63 | 1.78 | 1.31 |
| Viscosity @ 100 rad/sec., k Pa-s | 0.33 | 0.44 | 0.56 |
| Elasticity* | 0.032 | 0.104 | 0.049 |

*G'/G"

The high shear viscosity, which affects extrudability of the blowing agent laden melt, and the low shear viscosity and melt elasticity, which affect bubble growth and bubble stability are compared for the three (3) HDPE resins.

The data shows the high shear viscosity (100 rad/sec) of the conventional 7 MI HDPE is about 70% higher than that of the conventional 14 MI HDPE, which indicates relatively higher expected extrusion power requirements (amperage) and pressures for the conventional 7 MI HDPE. Lower, high shear viscosity is most desirable, indicating a relatively higher degree of shear thinning and in turn lower extruder amperage draw/easier processing. Higher, low shear viscosity and high melt elasticity allow for good foamability. The viscosity and elasticity at low shear (0.1 rad/sec) of the conventional 7 MI HDPE are about 100% and 50% higher, respectively, than for conventional 14 MI HDPE, indicating much higher relative melt strength and in turn, better foamability.

The data also shows high shear viscosity of the peroxide treated HDPE is about 30% higher than that of the conventional 14 MN HDPE, again indicating extrusion behavior similar to conventional 7 MI HDPE. Higher amps and pressures would again be expected for the conventional 7 MI HDPE compared to the conventional 14 Ml HDPE. Processability in extrusion, however, for the conventional 14 MI HDPE would be expected to be better than that of the conventional 7 MI HDPE. The viscosity and elasticity at low shear of the peroxide treated 7 MI HDPE are approximately 180% and 225% higher, respectively, than that of the conventional 14 MI HDPE. This also indicates a further, significant increase in melt strength and foamability as compared to the conventional 14 MI HDPE and even as compared to the conventional 7 MI HDPE.

The high shear viscosity of the peroxide treated 7 MI HDPE is approximately 30% lower than that of the 7 MI conventional HDPE. This indicates easier relative processability of the peroxide treated 7 HDPE. The viscosity and elasticity at low shear of the peroxide treated 7 MI HDPE are approximately 35% and 110% higher, respectively, than for the conventional 7 MI HDPE. The combination of lower high shear viscosity, higher low shear viscosity and elasticity indicates better extrudability and foamability for the peroxide treated 7 MI HDPE.

The three (3) HDPE samples are injection molded using 1% Safoam blowing agent to form a 75 lb standard pallet. The peroxide treated 7 MI HDPE resin gave a pallet weight of 68 lbs which indicates an increase in foaming and a significant material savings for the same extrusion conditions. The peroxide treated 7 MI HDPE also processed at a lower injection pressure and required a shorter cycle time by 20 seconds than the conventional 7 MI HDPE resin. The conventional 14 MI HDPE resin did not make an acceptable pallet, due to large voids and low foam formation from lack of melt strength.

EXAMPLE 2

A standard medium molecular weight HDPE sheet extrusion resin is treated to improve its foaming performance to manufacture a foamed core sheet. The sheet has a core of foamed material and two surface layers of unfoamed material. The HDPE resin having a melt index of 0.35 dg/min and a density of 0.954 g/cc is treated with 200 ppm of high temperature peroxide, Triganox 101 E-10. The peroxide solution is dry blended with the HDPE and compounded in a Farrel mixer at 220° C. for 1.5 minutes. A nitrogen atmosphere is maintained in the equipment during compounding. The peroxide treated HDPE resin is collected and its properties measured. The comparison of properties before and after treatment is as follows:

| Properties | HDPE | Treated HDPE |
|---|---|---|
| Melt Index, dg/min | 0.35 | 0.08 |
| Viscosity @ 0.1 rad/sec., k Pa-s | 35.0 | 68.0 |
| Viscosity @ 100 rad/sec., k Pa-s | 1.3 | 1.4 |
| Elasticity* | 0.62 | 1.14 |

*G'/G"

Each HDPE resin sample is mixed with 1% of a chemical blowing agent, Safoam FPE-50, and coextruded using a 3.5 inch Welex extruder to produce a foamed core sheet 200 mil in thickness. Surface layers of unfoamed HDPE are coextruded at a 15 mil thickness over the foamed core by two satellite extruders. Each sheet is then collected and measured for foam cell size and density reduction. The untreated HDPE sheet has a foam cell size of 1.1 mm and a density of 0.785 g/cc. The treated HDPE has a foam cell size of 0.6 mm and a density of 0.687 g/cc, showing superior foaming for the treated HDPE.

EXAMPLE 3

A 20 MI HDPE is treated with peroxide to yield a 0.6 MI HDPE product with improved foaming and processing characteristics. The 20 MI HDPE is treated with approximately 2500 ppm peroxide (Triganox 101 E-10) at a temperature in the range of 220–240° C. The resulting peroxide treated HDPE is tested for Theological properties at 190° C. and compared to 2 MI LDPE, 2 MI untreated HDPE, 0.4 MI untreated HDPE, and 20 MI untreated HDPE. 2 MI LDPE is commonly employed for producing low density (0.01–0.10g/cc) foam using extrusion technology and therefore used for comparative purposes.

|  | LDPE | HDPE | HDPE | HDPE | HDPE |
|---|---|---|---|---|---|
| Peroxide Treated | n.a. | untreated | untreated | untreated | treated |
| Melt Index, 2.16 kg, dg/min. | 2.0 | 2.0 | 0.4 | 20.0 | 0.6 |
| Viscosity @ 0.1 rad/sec., k Pa-s | 7.42 | 4.1 | 34.20 | 0.61 | 18.40 |
| Viscosity @ 100 rad/sec., k Pa-s | 0.4 | 1.2 | 1.26 | 0.34 | 0.74 |
| Elasticity @ 0.1 rad/sec. | 0.301 | 0.058 | 0.768 | 0.018 | 0.535 |
| Viscosity where G' = G", k Pa-s | 1.2 | 0.8 | 3.0 | $0.10^1$ | 2.5 |
| Frequency where G' = G", rad/sec | 15.0 | 250.0 | 30.0 | $\sim5000^1$ | 10.0 |

-continued

|  | LDPE | HDPE | HDPE | HDPE | HDPE |
|---|---|---|---|---|---|
| Crossover Modulus (dynes/ cm$^2$ × 10$^5$) | 1.2 | 15.0 | 4.0 | 90[1] | 1.8 |

*G'/G"
[1]Extrapolated values. Not able to be measured on a Rheometrics RMS-800 dynamic mechanical spectrometer.

The viscosity at low shear for 2 MI LDPE is higher than for 2 MI untreated HDPE, which provides initial indications of higher melt strength during the bubble forming process. Lower viscosity at higher shear also indicates more shear thinning for 2 MI LDPE than for 2 MI untreated HDPE, which provides easier processing. The higher elasticity (ratio of G'/G") at 0.1 rad/sec for 2 MI LDPE over 2 MI untreated HDPE shows 2 MI LDPE to have more ability to stretch without bubble collapse due to melt strength, essential for good foamability. A lower crossover modulus reflected in higher crossover viscosity at lower crossover frequency again points to improved melt strength and foamability for the 2 MI LDPE.

The 0.4 MI untreated HDPE shows improved (increased) elasticity as compared to 2 MI untreated HDPE, but at the expense of increased viscosity, which creates foam process difficulties due to shear heating and subsequent problems of heat removal in the extrusion process and subsequent cell collapse.

Extremes in viscosity, elasticity and crossover modulus in 20 MI untreated HDPE make for poor foaming. Peroxide treatment of 20 MI HDPE is needed to improve the foaming properties of the HDPE to the LDPE range of desired foaming properties. Viscosity is still somewhat higher at a given shear rate, and elasticity slightly lower. Crossover modulus is comparable.

The LDPE and the 0.6 MI peroxide treated HDPE samples are extruded into ~2 pcf foam sheet on a 27 mm, 40:1 L/D (length to diameter ratio of the conveying screws) twin screw extruder. Isobutane is used as the blowing agent, at 4–10% by weight, along with sodium bicarbonate/citric acid endothermic cell nucleator/chemical blowing agent (Clariant Hydrocerol CF 20E), at 0.50% by weight. An adjustable gap 1 inch annular die is used, stretching the foamed extrudate over a 3.5 inch mandrel at a rate of 25 lbs./hr. Foaming using the same process is also attempted with the 0.4 MI untreated HDPE sample, with no success. Complete bubble collapse is the cause, due to an inadequate balance of viscosity and melt strength (elasticity).

Changes and modifications in the specifically described embodiments can be carried out without departing from the scope of the invention which is intended to be limited only by the scope of the appended claims.

What is claimed is:

1. A process for forming articles consisting essentially of foamed high density polyethylene having an original density, prior to foaming, of at least 0.94 g/cc, comprising treating said high density polyethylene, prior to foaming, with a peroxide to provide a peroxide treated high density polyethylene having a low shear viscosity which is at least about 1.25 times the viscosity of the untreated high density polyethylene measured at 0.1 rad./sec. and a high shear viscosity which is less than about 3.0 times the viscosity of the untreated high density polyethylene measured at 100 rad./sec.;

admixing the peroxide treated high density polyethylene with a blowing agent; and foaming the peroxide treated high density polyethylene to form a closed cell foam product which exhibits a density reduction, as a result of foaming, of over 20%.

2. The process of claim 1, wherein the high density polyethylene, prior to foaming, has a melt index in a range from 0.05 to 200 dg/min.

3. The process of claim 1, wherein said density reduction, as a result of foaming is greater than about 60%.

4. The process of claim 1, wherein at least one antioxidant is admixed with said peroxide.

5. The process of claim 1, wherein the article is in flexible or rigid sheet form.

6. The process of claim 1, wherein the article is a rigid, molded product.

* * * * *